United States Patent [19]

Radke

[11] 3,840,247

[45] Oct. 8, 1974

[54] STOWABLE SEAT BELT ANCHOR ASSEMBLY FOR CONVERTIBLE VEHICLE SEAT

[75] Inventor: Arthur O. Radke, Milwaukee, Wis.

[73] Assignee: Universal Oil Products Company, Des Plaines, Ill.

[22] Filed: Nov. 24, 1972

[21] Appl. No.: 309,572

[52] U.S. Cl. ............................ 280/150 SB, 297/388
[51] Int. Cl. ............................................. B60r 21/00
[58] Field of Search ....... 280/150 SB; 297/390, 385, 297/388, 108

[56] References Cited
UNITED STATES PATENTS

| 114,679 | 5/1871 | Herschmann | 297/108 |
|---|---|---|---|
| 1,405,309 | 1/1922 | Matthews | 297/390 |
| 1,836,315 | 12/1931 | Druyun | 297/108 |
| 3,453,026 | 7/1969 | Paes et al. | 297/390 |

FOREIGN PATENTS OR APPLICATIONS

| 1,318,721 | 1/1963 | France | 297/390 |

OTHER PUBLICATIONS
Federal Specification JJ-B-185a, January 19, 1960, "Belt; Seat, Passenger Type, Automotive," pages 1,3,11.

Primary Examiner—David Schonberg
Assistant Examiner—Michael J. Forman
Attorney, Agent, or Firm—James R. Hoatson, Jr.; Barry L. Clark; William H. Page, II

[57] ABSTRACT

Seat belt anchor assembly for a multi-passenger vehicle seat convertible to a storage platform includes a pair of metal pivot links pivotally mounted to the vehicle frame at points which are spaced behind the seat at the ends thereof. An elongated, relatively wide and thin support member connects the free ends of the pivot links and spans the width of the seat so as to form a rigid anchoring means for all of the seat belts which are required for the seat. When the seat belts are not required, such as when the seat cushion and folding storage platform located behind it are pivoted so as to form a flat support surface, the pivot links may be pivoted rearwardly so that the elongated support member and the seat belts carried thereby may be stored on the vehicle floor under the storage platform. Since the elongated anchoring member, when in its use position, rests on the seat base which the seat cushion is pivotally mounted on, the entire central area under the seat base is left free for storage.

4 Claims, 5 Drawing Figures

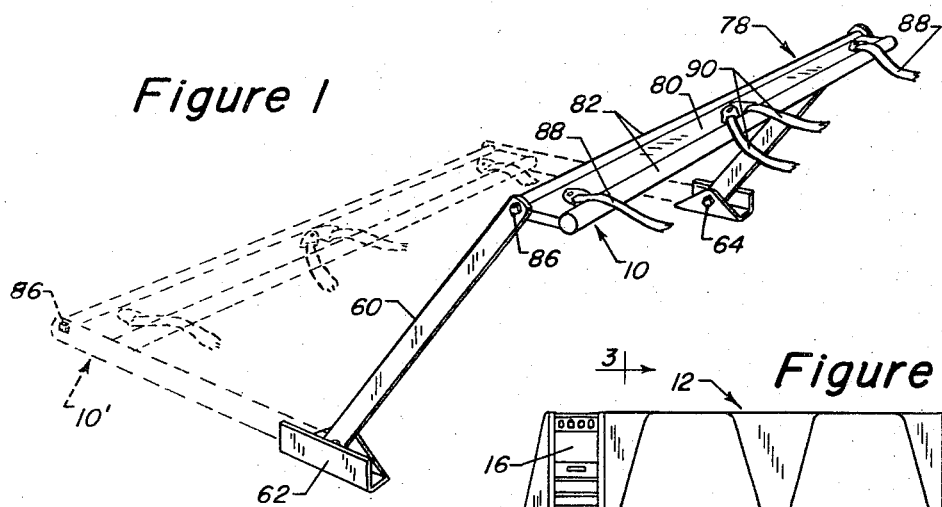
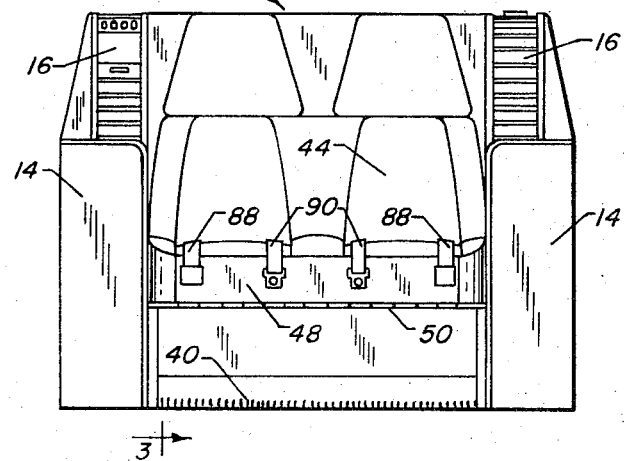
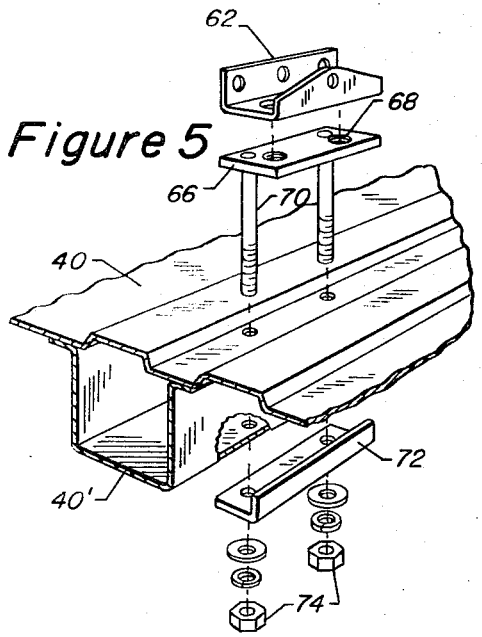
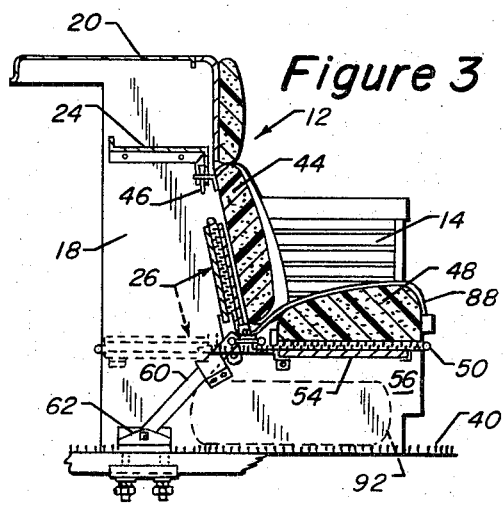
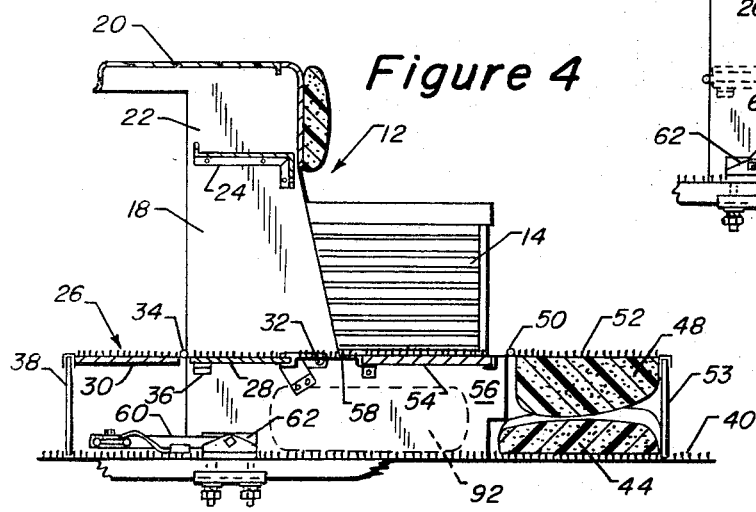

STOWABLE SEAT BELT ANCHOR ASSEMBLY FOR CONVERTIBLE VEHICLE SEAT

BACKGROUND OF THE INVENTION

This invention relates to seat belts and particularly to structures for mounting seat belts to the floor or frame of an automotive vehicle. Conventionally, the two straps comprising a seat belt assembly are individually mounted to the floor of the vehicle by rather massive anchor assemblies which are necessary to distribute the load to the vehicle floor without deforming the floor. According to current standards, anchor points for each seating position must be capable of withstanding a force of about 5000 pounds. Due to the heavy loading, the anchor assemblies obviously require a substantial amount of floor space which is thus rendered unusable for other purposes. For vehicles in which the occupants are seated on a two passenger bench seat, it is necessary to have three or four anchor points in the floor. When the bench seat is convertible to another purpose, such as to a support surface for a bed wherein seat belts are not required, and interfere with the use of the support surface, it is generally quite difficult and time consuming to disconnect the seat belts from their anchor points or to position them in such a manner that they will not interfere with the non-seating use to which the seat structure is placed. A seat whose cushion can pivot forwardly and which has other portions of a support platform attached to it could have access holes placed in it so that the center seat belt elements could be stored underneath the platform. However, such a mounting would not only make for a discontinuous support surface but would also make it somewhat easy for the seat belts to be left in their stored position, thus defeating their purpose, due to the difficulty of fishing them back into operative position when the structure is converted to a seating use.

SUMMARY OF THE INVENTION

It is an object of the present invention to provide a simple to use seat belt anchor for a multi-passenger seat which permits the seat belts for two or more seating positions to be instantly brought into and out of operative position whenever the seat structure is converted from a seating to a non-seating use and vice versa.

It is an additional object of this invention to provide a seat belt anchor assembly for a multi-passenger seat which requires only two anchored connections to the vehicle and which does not require any anchored connections to the vehicle intermediate the ends of the seat, thus leaving the underseat area available for the storage of a spare tire or other items.

The improved seat belt anchor assembly comprises a pair of rigid link members which are pivoted at their inner ends to the vehicle floor at points which are near the ends of the seat and spaced behind the seat. The outer ends of the links are connected to the ends of a wide, thin, rigid support member which extends the width of the seat. The structure is particularly useful with a seat which has its seat cushion pivotally movable about its lower front edge to a forward position wherein the cushion is rotated 180° so that its bottom surface becomes a support surface. The elongated support member is adapted to be pivoted into a forward use position overlying the seat base at a location just to the rear of the seat cushion. When the seat cushion is to be moved forwardly to convert the seat structure to another use, such as to a support platform for a bed or for cargo, the support member can be simply pivoted rearwardly to a point where it will rest on the vehicle floor. Since the seat belts are each attached to the support member it is obvious that they will be carried with the anchor support member and thus instantly available for use whenever the support member is moved to its forward use position.

BRIEF DESCRIPTION OF THE DRAWING

FIG. 1 is a perspective view of the pivotable seat belt anchor assembly showing it in its use position in solid lines and in its storage position in dotted lines;

FIG. 2 is a front plan view of a convertible seat and storage unit on which the pivoted seat belt anchor assembly is adapted to be used;

FIG. 3 is a side sectional view of the structure shown in FIG. 2 taken on line 3—3 and showing the seat belt anchor assembly in its forward use position;

FIG. 4 is a side plan view similar to FIG. 3 but showing the seat and seat belt anchor assembly pivoted to their storage positions; and, FIG. 5 is an exploded perspective view showing the manner in which the seat belt anchor assembly is anchored to the frame of the vehicle.

DESCRIPTION OF THE PREFERRED EMBODIMENT

Referring to FIG. 1, the pivoted seat belt anchor assembly is shown in its normal use position in solid lines at 10 and in its storage position in dotted lines at 10'.

The seat belt anchor assembly 10 is adapted to be used with either a single or multi-passenger convertible seat unit wherein there is a need for seat belts only when the unit is in its seating configuration, but there being no need for the seat belts when the unit is in its non-seating configuration. The seat belt assembly 10 is also useful for an ordinary multipassenger seat when there is a desirability to provide a support for the required inboard seat belts without obstructing the floor space under and behind the seat with mounting brackets.

A particular type of convertible seat on which the pivoted seat belt anchor assembly 10 has been found to be quite useful is the combination seating and storage unit indicated generally at 12 in FIG. 2. The unit 12 is adapted to be mounted in the rear of a van type vehicle and includes side cabinets 14, clothes closets 16, and a rear storage compartment 18 defined by a top member 20 and side walls 22. The rear storage compartment 18 includes an upper rear shelf 24 and a rear support platform indicated generally at 26 which comprises a forward section 28 and a rearward section 30. The forward section 28 is pivoted at 32 for movement from the position shown in FIG. 4 to the position shown in FIG. 3. The rearward section 30 is pivoted to the front section 28 by a rear pivot member 34. In order to store the support sections 28, 30 in the generally vertical position shown in FIG. 3, the rear section 30 is first pivoted to the intermediate position shown at 26' in FIG. 3. During use, the forward section 28 is supported (FIG. 4) by a bracket 36 attached to side wall member 22. The rearward section 30 is supported by folding leg members 38 which rest on the floor 40 of the vehicle.

The floor 40 and support platform 26 may be carpeted if desired.

It will be obvious from the preceding description that the seating and storage unit 12 can have its rear storage compartment 18 configured with the support platform 26 in any of the three positions shown in FIGS. 3 and 4 without affecting the manner in which the seating portion of the unit is used. The seating portion of the unit comprises a seat back member 44 which is locked to the forward edge of the rear shelf member 24 by a locking pin 46. Seat cushion member 48 is hinged at its lower forward edge by a hinge member 50 to base frame 56. The hinge member 50 permits the seat 48 to be pivoted 180° in a forward direction so that the undersurface 52 of the cushion 48 forms a flat support surface which may be supported at its forward end by a pair of legs 53 which rest on the floor 40. When the seat 48 is in its normal use position shown in FIG. 3, it rests on a removable seat base member 54 which is supported by base frame 56. The base frame 56 includes a horizontal flat top surface 58 behind the removable panel 54 which is adapted to support the seat belt anchor assembly 10 when the latter is in its forward position.

Referring again to FIG. 1, the seat belt anchor assembly 10 includes a pair of widely spaced elongated support elements or pivot links 60 mounted to floor brackets 62 by fastening means 64 such as a bolt or rivet. Since the floor brackets 62 must be mounted to the floor 40 in such a manner as to transfer very large loads to the floor, it is necessary to spread the loading to the floor 40 and its integral beams 40' over as large an area as possible. This may be done as shown in detail in FIG. 5 by fastening the floor brackets 62 to support plates 66 by means of bolts (not shown) which engage threaded holes 68. The support plates 66 have studs 70 extending from them which are adapted to be passed through holes in the floor 40 and beam 40' and through holes formed in a reinforcing angle member 72 welded to the floor beam 40'. Fastening members 74 engage the ends of the studs 70 and anchor the floor brackets 62 to the vehicle floor 40 and floor beam 40'. Referring back to FIG. 1, the anchor assembly 10 includes an elongated horizontal support member indicated generally at 78 which is of very heavy construction since it must span the width of the seat and transfer loads applied at its center to its ends. As shown, the member 78 comprises a flat bar portion 80 welded along each of its sides to rods 82 having a greater diameter than the thickness of the bar portion 80. The bar could also be made in other ways such as by extrusion. The end of one of the rods 82 is tapped for receipt of bolts 86 or other fastening means which mount the support member 78 to the pivot link members 60. The outboard seat belt members 88 shown in FIG. 2 are mounted near the ends of the support member 78 while the inboard seat belt members 90 are mounted at the center of support member 78. The support member 78 preferably has a cross-section somewhat like an I-beam and is fastened to the pivot links 60 at a location near the top of its I-cross-section. Thus, loads applied by the seat belts will cause member 78 to pivot so that loads are transmitted by it along the width of flat bar portion 80 rather than through its thickness. Obviously, the member 78 is much stronger in this direction.

From the preceding description, it will be obvious that the pivoted seat belt anchor assembly 10 and the seat belts 88, 90 attached to it can be simply and quickly moved into or out of operative position relative to the seat members 44, 48 by merely taking hold of the support member 78 and moving it from its operative position on top of the seat base top surface portion 58 shown in FIG. 3 to its inoperative storage position shown in FIG. 4 where it rests upon the floor 40. Since the support member 78 spans the width of the seat cushion 48 it will be obvious that it leaves the storage space under seat 48 clear so that items such as a tire 92 can be stored under the seat and easily removed from the rear of the vehicle.

I claim as my invention:

1. In combination with a vehicle having a multi-passenger seat convertible from a seating use configuration to a storage platform configuration, a stowable seat belt anchor assembly comprising:

a plurality of seat belt members, a pair of pivotally movable elongated rigid support elements mounted at one end to spaced apart points on the vehicle floor which are located at a predetermined distance behind the seat; a rigid elongated seat belt support member extending transversely of the vehicle and between said pair of elements and being mounted at each of its ends to the free ends of said elongated rigid support elements; said elongated seat belt support member being selectively positionable in a forward seating use position above the vehicle floor and adjacent the rear of the seat wherein said seat belt support member provides the sole support for at least all of the seat belt members for the seating positions on said seat which are positioned inwardly from the seat ends, and in a rearward storage position on the vehicle floor behind the seat wherein said seat belt support member is stowable along with said seat belt members when said seat is converted to a non-seating use.

2. The combination of claim 1 wherein said elongated seat belt support member comprises a generally flat metal extrusion.

3. The combination of claim 1 wherein said seat has a cushioned seating portion and a base portion, the cushioned portion being pivotally mounted for forward movement away from said base portion, said elongated seat belt support member being positioned on top of said base portion and adjacent said cushioned seating portion when said elongated seat belt support member is in its forward seating use position.

4. In combination with a vehicle having a seat convertible from a seating use configuration to a storage platform configuration, a stowable seat belt anchor assembly comprising:

a plurality of seat belt members, a pair of pivotally movable elongated rigid support elements mounted at one end to spaced apart points on the vehicle floor which are located at a predetermined distance behind the seat; a rigid elongated seat belt support member extending transversely of the vehicle and between said pair of elements and being mounted at each of its ends to the free ends of said elongated rigid support elements; said elongated seat belt support member being selectively positionable in a forward seating use position above the vehicle floor and adjacent the rear of the seat wherein said elongated seat belt support member provides the sole support for all of the seat belt members required for the seat and in a rearward storage position on the vehicle floor behind the seat wherein said elongated seat belt support member is stowable along with said seat belt members when said seat is converted to a non-seating use.

* * * * *